July 24, 1962 W. H. WOODING ETAL 3,046,386
ARTICULATED WING SHOE FOR THE ELECTROSLAG
AND ELECTROGAS WELDING EQUIPMENT
Filed Jan. 3, 1961 3 Sheets-Sheet 1

INVENTORS
James E. Norcross
Royal David Thomas, Jr.
BY Walter H. Wooding
ATTORNEYS

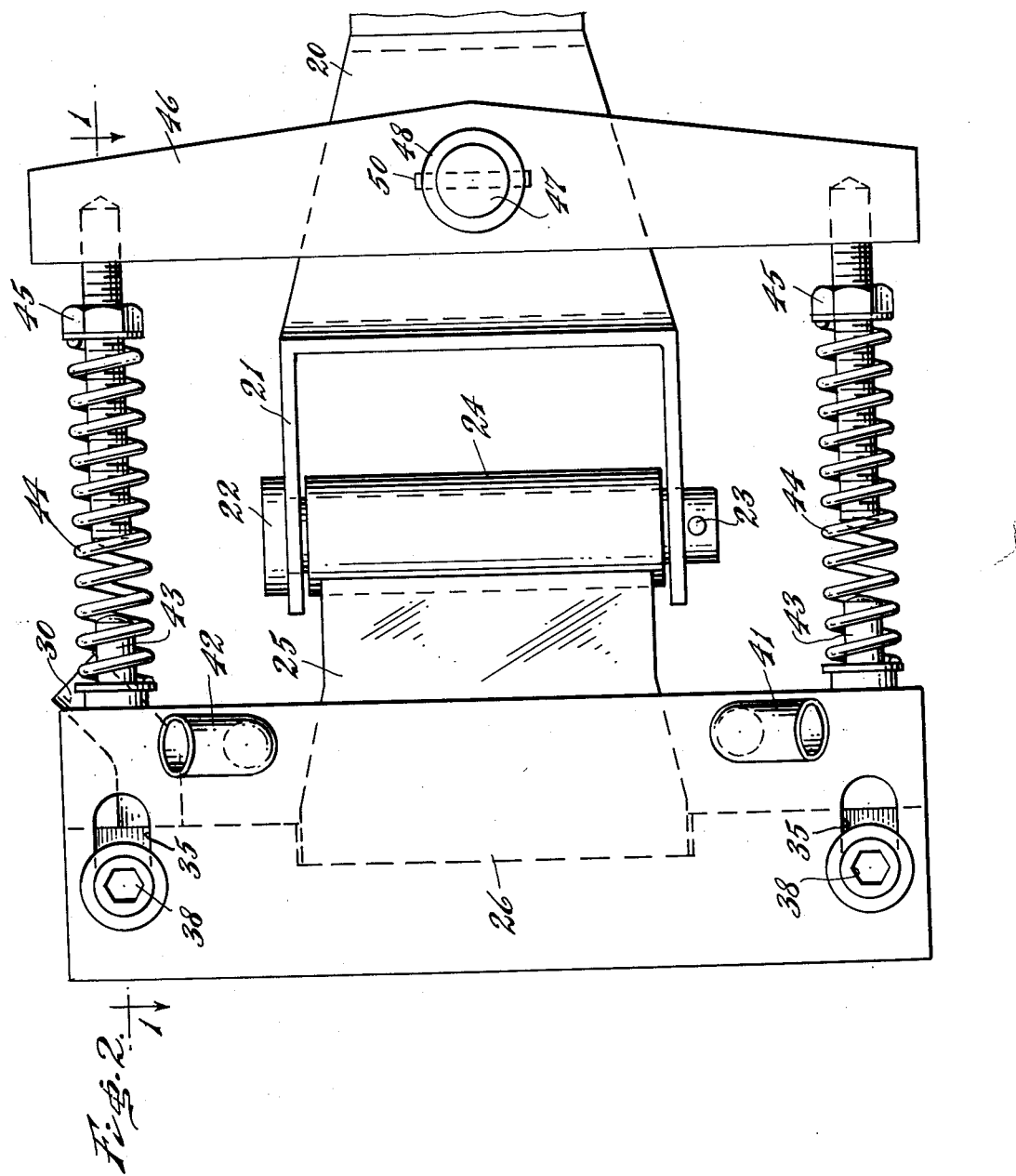

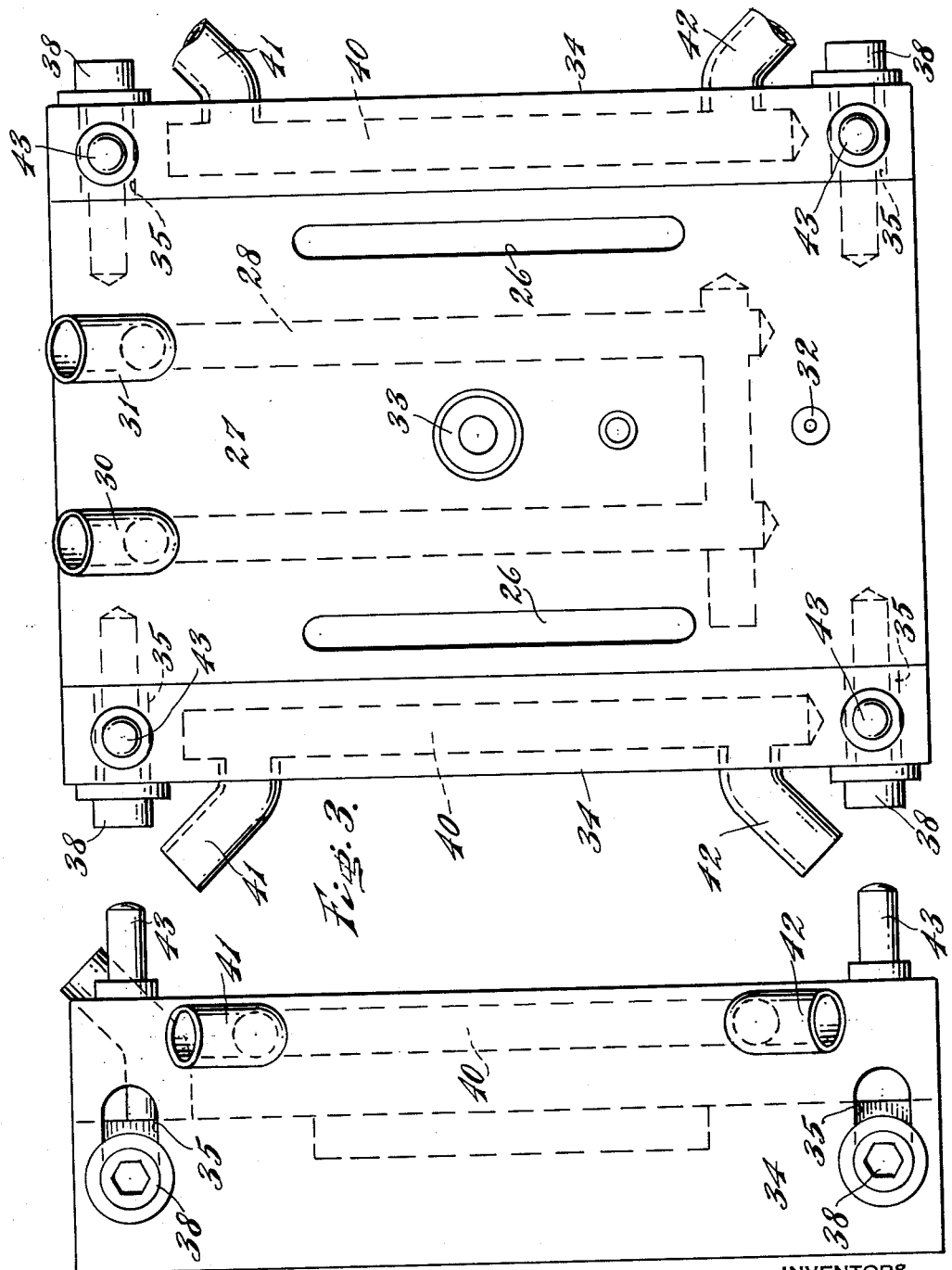

United States Patent Office 3,046,386
Patented July 24, 1962

3,046,386
ARTICULATED WING SHOE FOR THE ELECTROSLAG AND ELECTROGAS WELDING EQUIPMENT
Walter H. Wooding, Broomall, Royal David Thomas, Jr., Narberth, and James E. Norcross, Media, Pa., assignors to Arcos Corporation, Philadelphia, Pa., a corporation of Pennsylvania
Filed Jan. 3, 1961, Ser. No. 80,502
5 Claims. (Cl. 219—126)

The present invention relates to mechanism for vertical welding and especially to an improved welding shoe combination for use in vertical welding.

This application is a continuation-in-part of our copending application, Serial No. 52,550, filed August 29, 1960, for Articulated Wing Shoe For The Vertomatic Welding Equipment, now abandoned.

A purpose of the invention is to more effectively adjust for variations in the dimension of plates which are being welded and more completely prevent leakage of molten metal and/or slag from the weld area.

A further purpose is to prevent accentuation of disconformity in the weld which may otherwise occur due to poor contact between the welding shoe combination and the work.

A further purpose is to guide the wing or side shoes on the intermediate shoe and resiliently urge both the tops and the bottoms of the wing or side shoes against the work.

A further purpose is to pivot the intermediate shoe at a point between springs acting on the wing or side shoes so that when the intermediate shoe pivots, the springs can deflect laterally to allow the wing or side shoes to continue to function.

Further purposes appear in the specification and in the claims.

In the drawings we have chosen to illustrate one only of the numerous embodiments in which the invention may appear, selecting the forms shown from the standpoints of convenience in illustration, easy operation and clear demonstration of the principles involved.

FIGURE 2 is a side elevation of the device of FIGURE 1 omitting the work.

FIGURE 3 is a front elevational view of the shoes alone, omitting the support mechanism.

FIGURE 4 is a side elevation of the shoes alone, omitting the support.

Figure 1:
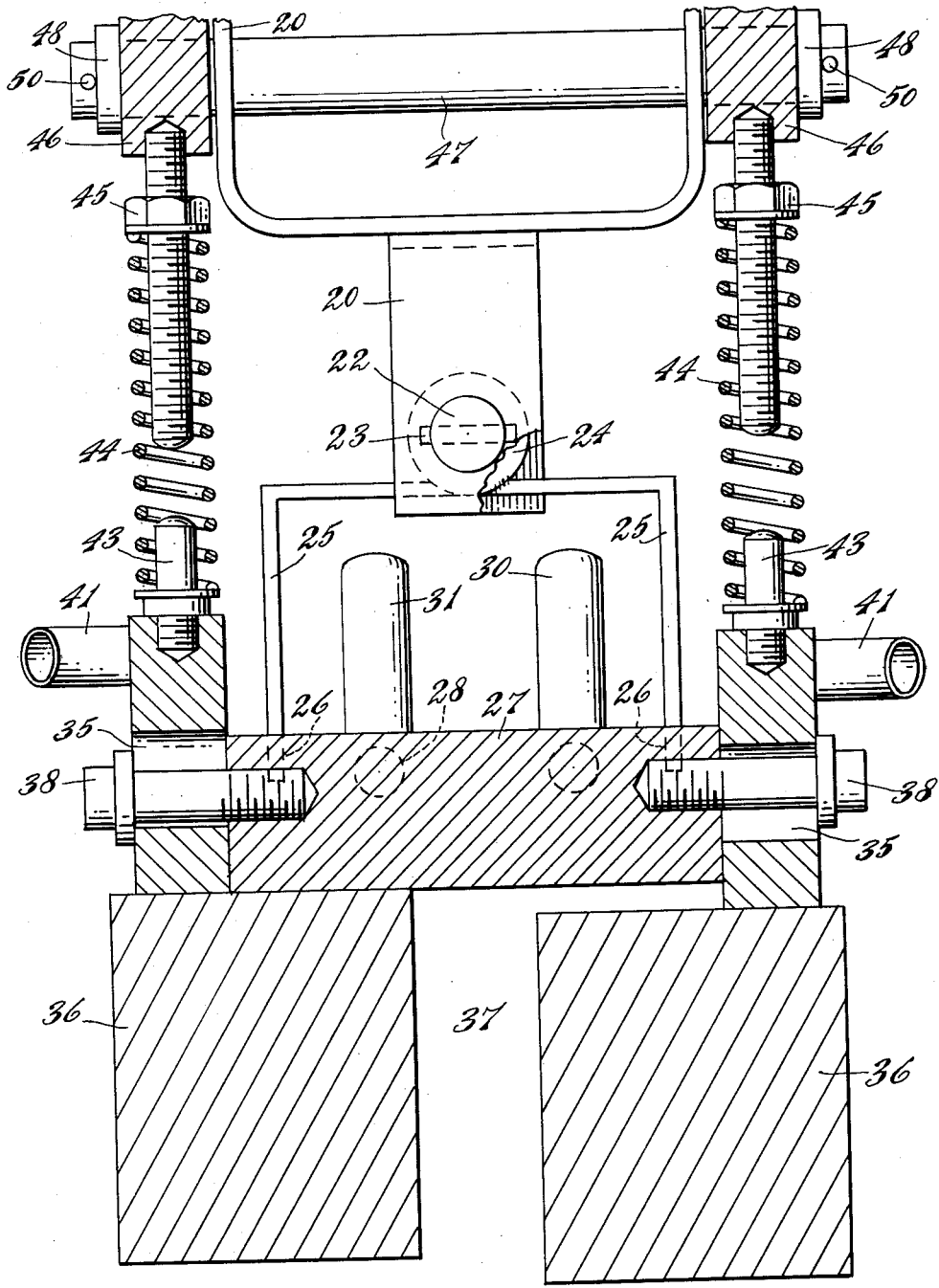
FIGURE 1 is a diagrammatic plan section of the work, the shoes and the mechanism for positioning the shoes according to the invention.

Describing in illustration but not in limitation and referring to the drawings:

In vertical welding especially of heavy steel and other metallic plates, whether by the submerged arc or by the gas shielded arc, and especially for automatic welding, water cooled copper shoes or dams are used which bridge the weld gap so as to confine the molten slag and weld metal until the weld metal has solidified. In order to accommodate differences in heavy steel plates of the same gauge as well as plate camber and other irregularities, it is important to provide a shoe combination which can articulate effectively. The prior art construction using an intermediate shoe and a hinged wing or side shoe at each side is not adequate for the ranges of size and shape variation.

In accordance with the present invention a new shoe combination has been produced in which the wing or side shoes have great mobility and are capable of swinging about an axis, and adjusting for variation in distance of more than one inch. This movement takes place while the device automatically maintains reasonable contact between the surfaces of the center shoe and the wing or side shoes to prevent seepage of slag and molten metal at these joints.

Considering now the drawings in detail, the shoes progress vertically under the action of a spring loaded ram (urged toward the work) whose forward end 20, as seen in FIGURES 1 and 2, rigidly mounts a yoke 21 which carries at its forward end a vertical pivot 22, suitably a pin held in place by a retainer 23.

Pivoting on the pivot 22 is a bearing 24 which rigidly mounts bifurcated forwardly extending arms 25 which extend into and rest within rearwardly extending slots 26 from the rear of an intermediate copper shoe 27. The copper shoe 27 has intermediate water passages 28 to which water is connected by inlet connection 30 and outlet connection 31.

The intermediate shoe 27 is provided with a well 32 for a slag level probe as well known and with an opening 33 for a weld metal probe as well known.

At each side of the intermediate shoe 27 there is a wing or side shoe 34 also desirably of copper. The wing or side shoes have slots 35 at the top and bottom extending toward and away from the plates 36 which constitute the work and adjoin the weld space 37. The slots 35 receive bolts 38 extending into the adjoining side of the intermediate shoe, and tightened to such an extent that the wing or side shoes are free to rock with respect to the intermediate shoe while being guided by the bolt and slot combination.

The wing or side shoes have internal water passages 40 which receive water through inlet connections 41 and discharge water through outlet connections 42.

At the top and bottom of each wing or side shoe on the rear surface there is a spring abutment 43 which receives the forward end of a helical compression spring 44, the rearward end of which is received by an adjustable spring abutment 45 which is mounted near the outer end on a rocker arm 46 which is pivoted intermediate its end on pivot 47 which extends through the ram 20 and holds the rocker arm by washers 48 and pins 50.

In operation, the intermediate shoe is pressed against the work by the ram 20. To a certain extent the intermediate shoe tends to pivot around the vertical pivot pin 22 and to the extent that the intermediate shoe thus pivots, the wing or side shoes pivot with it and adjustment is made by side deflection of the helical compression springs 44 so that their axis is no longer straight.

To the extent that the adjoining surfaces of the plates being welded differ in position, each wing shoe follows its adjoining plate, so that as shown in FIGURE 1, one wing shoe is relatively rocked on its guide bolts 38 and forwardly advances at one end under the action of a helical compression spring 44 as compared with the other wing shoe.

Accordingly, when the plates being welded deviate from the same contour, excessive weld reinforcement does not take place, but the wing or side shoes particularly try to compensate for and correct the deviation.

The arms 46 are free to rock on the pivot 47 in accordance with the motion of the wing shoes, so that the different arms 46 at a given time may be at slightly different angular positions.

It will be evident that in many cases the shoe combination will surround a cylindrical or other curved object in which case the surfaces of both the intermediate shoe and the wing shoes will suitably be curved as desired.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claim.

Having thus described our invention what we claim as new and desire to secure by Letters Patent is:

1. In vertical welding mechanism, a welding shoe combination, comprising an intermediate shoe, means for supporting the intermediate shoe, wing shoes on either side of the intermediate shoe, guide means permitting the wing shoes to move relatively toward and away from the work and permitting the forward faces of the wing shoes to rock about a horizontal axis with respect to the vertical, resilient means for urging the top of each wing shoe toward the work and resilient means urging the bottom of each wing shoe toward the work.

2. Mechanism of claim 1, in which the resilient means for urging the top of each wing shoe toward the work comprises a helical compression spring and the resilient means for urging the bottom of each wing shoe toward the work comprises a helical compression spring.

3. Mechanism of claim 2, in which said resilient means comprise arms horizontally pivoted intermediate their ends on said means for supporting said intermediate shoe, said arms connecting to said springs at their ends.

4. Mechanism of claim 1, in which said guide means comprises a bolt and slot connection between each wing shoe and said intermediate shoe.

5. Mechanism of claim 1, in which said means for supporting said intermediate shoe comprises vertical pivot means interposed between said resilient means, and permitting all shoes together to swing on said vertical pivot means.

References Cited in the file of this patent

UNITED STATES PATENTS

| | | |
|---|---|---|
| 2,766,368 | Berkeley | Oct. 9, 1956 |
| 2,887,972 | Handley | May 26, 1959 |

Disclaimer

3,046,386.—*Walter H. Wooding*, Broomall, *Royal David Thomas, Jr.*, Narberth, and *James E. Norcross*, Media, Pa. ARTICULATED WING SHOE FOR THE ELECTROSLAG AND ELECTROGAS WELDING EQUIPMENT. Patent dated July 24, 1962. Disclaimer filed Apr. 26, 1965, by the assignee, *Arcos Corporation*; the inventors assenting.

Hereby enters this disclaimer to all the claims of said patent.

[*Official Gazette July 20, 1965.*]